UNITED STATES PATENT OFFICE 2,346,188

PIGMENT AND METHOD OF PREPARING SAME

Durant W. Robertson, Montclair, N. J., assignor to National Lead Company, New York, N. Y., a corporation of New Jersey No Drawing. Application October 8, 1940
Serial No. 360,222

4 Claims. (Cl. 106—299)

This invention relates to pigments and to methods for improving the technical properties thereof. It has particular reference to improving the weather resistance of titanium dioxide pigments.

The present application is a continuation-in-part of copending application, Serial No. 302,116, filed October 31, 1939.

The poor weathering characteristics and discoloration on exposure to light have heretofore restricted the use of titanium dioxide pigments, for example, in coating composition, and the superior pigmenting power of such pigments could, therefore, not be utilized to the fullest extent in the formulation of paints and other coating materials for exterior service.

Titanium dioxide pigments prepared in accordance with the present invention, when incorporated in surface coating compositions, are rendered more resistant to weathering; that is to say, they exhibit enhanced gloss retention and a reduced tendency toward chalking and at the same time are materially improved in their resistance to discoloration in the light.

The invention, however, is not restricted to the preparation of titanium dioxide pigments but is applicable to pigment materials generally. Pigments prepared in accordance with the present invention will be improved in one or more, and not necessarily the same, important respects. Thus, the improvements imparted to titanium dioxide pigments by the methods of the present invention are evidenced primarily by enhanced weather resistance. Other pigments prepared according to the invention may exhibit improvements in other respects; for instance, an increase in covering or hiding power.

The principal object of the invention is, therefore, among others, to provide methods for improving the technical properties of pigment materials. Another object of the invention is to provide methods for improving the weather resistance of pigments. The third object of the invention is to provide methods for improving the covering power of pigments. The objects embrace not only the methods for preparing the improved pigments but the pigments as well. These objects and others will become apparent as this description unfolds.

In its broadest conception the present invention comprises a treatment of a previously prepared pigment material with a water-insoluble silica compound to bring about an intimate and uniform association, possibly a coating of the particles of the pigment with the insoluble silica compound. It is essential that this intimate association of pigment particles be carried out in the moist state. This may be accomplished (a) by suspending the particles of a previously prepared pigment in aqueous media and forming the insoluble silica compound, in situ, or (b) by intimately associating the pigment particles with a gelatinous non-coagulated hydrated gel of such silica compounds. For purposes of practical operation the first method would be preferred in the application of the invention.

The silica compound may be formed by a reaction between a water soluble silicate and a water soluble compound containing an ion capable of reacting with a water soluble silicate to form a precipitated, insoluble silica compound. When, according to the invention, there is employed as the precipitant a water soluble compound containing the ion of a metal, the silicate of which is water insoluble, the precipitated silica compound will be in the nature of a metal silicate. When the compound employed as a precipitant is an acid compound, for instance, hydrochloric or sulfuric acid, the insoluble silica compound precipitated will be hydrated silica. When using a metal compound as precipitant, the metal should preferably be polyvalent.

In the following paragraphs the invention is described with reference to the use as precipitant, of a water soluble metal compound yielding a precipitate of metal silicate, preferably white metal silicate.

The substantially water insoluble, white silicates which have been found most useful in the practice of the invention are those of metals of the second, third and fourth groups of the periodic system which may be formed by the reaction between a water soluble silicate and a water soluble compound of a metal of these groups. For instance, the silicates of magnesium and zinc, representative of metals of group II, those of aluminum and yttrium, representative of metals of group III, and those of zirconium and cerium, representative of metals of group IV are especially useful.

When the insoluble silicate is to be formed, in situ, the general method of practicing the invention will be as follows:

A water soluble metal compound the silicate of which is white and substantially water-insoluble, preferably a compound of a metal of the second, third, or fourth group is added to an aqueous slurry of a previously prepared pigment material. The slurry may be prepared by any suitable known means such as milling, grinding, or vigorously stirring the pigment particles into the aqueous medium. Known dispersing agents may be employed to assist in the dispersion of the pigment particles, if desired. The water soluble metal compound may be added to the slurry either as a water solution thereof or as a pulverized solid while properly agitating the mass to insure good distribution of the soluble metal compound.

A water soluble silicate is now added to this slurry whereby the silicate compound is precipitated and incorporated with the pigment material, the slurry then being filtered and washed and the pigment dried and further handled in a manner customary for the finishing of dried pigments. Alternatively, a water soluble silicate may be added to the pigment slurry whereby the pigment is more completely dispersed and whereby, if so desired, any gritty material and agglomerates more easily may be eliminated by hydro-separation or by other means prior to the precipitation of the difficultly soluble silicate by the addition of the water soluble metal compound. The pigment slurry also may be advantageously treated prior to the silicate treatment in a colloid or pebble mill in order to disintegrate gritty materials and agglomerates which may be present in the pigment.

The invention is operable with any water soluble silicate, but those of the alkali metals are preferred, mainly those of sodium and potassium.

If the insoluble silicate is separately prepared, the general method of practicing this feature of the invention is as follows:

The insoluble silicate is preferably prepared by a double decomposition reaction in aqueous media between a soluble silicate and the salt of a metal, the silicate of which is substantially insoluble. It will be found that the resulting precipitated silicate will be gelatinous, hydrated, and non-coagulated. For optimum results care should be exercised that the pigment be incorporated with the gelatinous silicate before the silicate dehydrates and dries. This incorporation of pigment particles with the gelatinous silicate may be affected by means of any convenient mixing technique, for instance, milling, grinding, vigorous agitation, and so forth.

The amount of precipitated silicate incorporated in the pigment is in no way restricted to any specific amount, but is determined to a large extent in each individual case by the nature of the pigment, the particular properties improved by the invention, and the use for which the pigment is intended. However, in general, the amount of silicate associated with the pigment material for most practical purposes restricts itself to between a fraction of 1.0 per cent and about 10.0 per cent. For ordinary use about 2.0 per cent to 5.0 per cent of the silicate has been found to be sufficient for a marked improvement in resistance to discoloration and weathering, at the same time not disturbing other pigment characteristics to any noticeable degree. When the silicate is formed, in situ, the amount thereof desired will be obtained by controlling the amount of water soluble silicate and metal compound employed.

When the particles of the pigment are intimately associated with the insoluble silicate by either of the methods above described, the treated pigment particles are dewatered, dried, and subjected to a light pulverizing treatment. The treated pigment is then ready for use in surface coating compositions.

It will be understood in connection with the practice of the invention that the various silicates such as those of aluminum and zirconium may differ somewhat in degree of solubility and in tendency to hydrolyze. For example, the silicates of cadmium and aluminum are very slightly soluble in water, but nevertheless useful in the practice of the present invention. The silicate of barium exhibits some solubility as well as a tendency to hydrolyze. Accordingly, when intimately associating pigment particles with barium, it is recommended that the operation be carried out in the cold. Ordinarily, however, the invention may be practiced at elevated temperatures if desired, and in fact, it appears that the intimate association of silicate and pigment particles is favored by proceeding at temperatures above normal, for example, between 40° C. and the boiling point of the solution, preferably between 60° C. and 80° C. When operated at the elevated temperatures, it appears that the silicate more uniformly and evenly associates itself with the pigment particles. While the nature of the association is not known, it may be that the silicate coats the particles or perhaps penetrates into the structure of the particles. Furthermore, it has been found that good results may be obtained by leaving the treated pigment in contact with the reaction mixture after formation of the insoluble silicate, or after mixing the pigment particles with a separately prepared insoluble silicate gel. By thus permitting the pigment particles to remain in contact with the liquid medium, the association of the pigment particles and the silicate appears to be further favored. This retention period may be for as little as one hour, or if desired, for as long as twenty-four hours.

In order that the invention may be more readily and thoroughly comprehended a few examples of the process which has been described above are given below. These examples are specific to the treatment of titanium dioxide pigments but it should be understood that they are given for purely illustrative purposes and that the invention thereby should not be limited or restricted in any way or manner.

*Example I*

1000 parts of calcined titanium dioxide are slurried in 3760 parts of water containing 26.3 parts of $MgCl_2$. Thorough distribution of the salt in the slurry is insured by adequate stirring. To this slurry is now slowly added during constant agitation a solution of sodium metasilicate containing 36.3 parts of $Na_2SiO_3$, an amount chemically equivalent to the amount of magnesium chloride present in the slurry. At the conclusion of the addition of the sodium silicate the pH value of the slurry is adjusted to between 7.0 and 7.4 and the slurry is then filtered. The treated pigment is washed to remove sodium chloride and is finally dried and disintegrated before being used.

Other soluble salts of the second group metals such as zinc sulphate can be substituted for the magnesium chloride used in this example.

*Example II*

1000 parts of calcined titanium dioxide are slurried in 3760 parts of water and treated with a sodium silicate solution containing 36.3 parts of $Na_2SiO_3$ in 300 parts of water. Thorough distribution of the silicate in the slurry is insured by adequate agitation. To this slurry wherefrom, if so desired, all gritty materials and large agglomerates now may be eliminated by known means of hydroseparation before further treatment, is slowly added a solution of magnesium chloride containing 28.3 parts of $MgCl_2$ in 300 parts of water, an amount chemically equivalent to the amount of sodium silicate present. The slurry is thoroughly agitated during the addition of the magnesium chloride and is, after the conclusion of the treatment and the adjustment to the proper pH, filtered and washed to remove sodium chloride, the pigment finally being dried and disintegrated before being used.

Other soluble salts of the second group metals such as, for example, zinc sulfate, can be substituted for the magnesium chloride used in this example.

*Example III*

1000 parts of calcined titanium dioxide are slurried in 3760 parts of water containing 50 grams of $AlCl_3.6H_2O$. To this slurry which is being thoroughly agitated to insure complete distribution of the aluminum salt, is now slowly added a solution of "Metso" ($Na_2SiO_3.5H_2O$) equal to 37.9 parts of $Na_2SiO_3$ in 300 parts of water, an amount chemically equivalent to the amount of aluminum chloride present. At the conclusion of the treatment, when the double decomposition of the aluminum chloride and the sodium silicate is completed, the pH of the slurry is adjusted to the proper value, 7.0 to 7.4, and the pigment washed to remove sodium chloride, whereupon the pigment is dried at 110° C. and disintegrated before being used.

Other soluble salts of the third group metals, such as, for example, aluminum sulfate and yttrium chloride can be substituted for the aluminum chloride used in the above example.

*Example IV*

900 parts of calcined titanium dioxide are slurried in 3630 parts of water containing 45 parts of $ZrOCl_2.8H_2O$. The slurry is thoroughly agitated to insure complete distribution of the zirconium salt, and a solution of sodium silicate containing 30 parts of "Metso" ($Na_2SiO_3.5H_2O$) in 300 parts of water, an amount of silicate chemically equivalent to the amount of zirconium salt present, that is for the formation of the zirconium silicate ($ZrO.SiO_2$), is slowly added. The slurry is, after adjustment to the proper pH, filtered and washed to remove sodium chloride and the pigment is finally dried and finished in the usual manner.

Other soluble salts of the metals of the fourth group can be used for the treatment, such as the sulfate of zirconium, cerium salts and others.

In order to test the pigments which are described in the foregoing examples as to their weathering characteristics, an exterior paint enamel was formulated in which the silicate-treated pigments each were incorporated as the single pigmenting material except for a small amount of lamp black which was added as a tinting agent. The prepared panels, together with the proper control (untreated pigments) were exposed outdoors.

The cedar panels were coated with three coats of enamels pigmented with 100 per cent titanium dioxide pigment in a vehicle consisting of:

| | Per cent |
|---|---|
| Heat processed tung linseed oil | 14.9 |
| Heat bodied linseed oil, acid No. 2.4, Gardner-Holdt viscosity R to S | 21.18 |
| Phenolic resin varnish | 40.93 |
| Thinner and driers | 22.95 |

The pigment was approximately 20.3% by volume of the total nonvolatile.

*Chalking*

| Treatment outdoor exposures, weeks | Control | Example I, 3.0% Mg silicate | Example III, 3.0% Al silicate | Example IV, 3.0% Zr silicate |
|---|---|---|---|---|
| 1 | V. sl. | None | None | None. |
| 2 | Sl. | do | do | Do. |
| 3 | Sl. | do | do | V. sl. |
| 4 | Sl. | do | do | Sl. |
| 5 | Cons. | Sl. | Sl. | Sl. |
| 6 | V. b. | Cons. | Cons. | Cons. |
| 7 | V. b. | Cons. | Cons. | Cons. |
| 8 | V. b. | B. | B. | B. |
| 9 | V. b. | B. | B. | B. |

NOTES.—None=no chalking; V. sl.=very slight chalking; Sl.=slight chalking; Cons.=considerable chalking; B=bad chalking; V. b.=very bad chalking.

As an example of the improved resistance to discoloration on exposure to light, which is obtained in pigments which have been treated with relatively insoluble silicates, may be given the titanium dioxide pigment containing 3.0 per cent zirconium silicate described in Example IV.

This pigment was tested in a damar solution and in a Bakelite resin varnish under ultra-violet light. The silicate-treated pigment was in both cases superior to the untreated pigment in regard to resistance to discoloration.

The results are given below.

| | Gloss | Discoloration in— | |
|---|---|---|---|
| | | Bakelite (pinkish) | Damar |
| Control | High | 2 | 1 |
| Example IV, 3.0% Zr silicate | do | 1+ | Better than 1 |

The degree of discoloration is expressed in relation to arbitrarily chosen reflectances, where the numeral 1 designates the value of the best standard pigment and the numeral 2 the value of a different and inferior standard. For the so-called Bakelite test the pigment was formulated in an exterior paint using 100 per cent titanium dioxide as a pigment. The vehicle consisted of:

| | Per cent |
|---|---|
| Heat-processed tung linseed oil | 15.5 |
| Heat-bodied linseed oil | 22.1 |
| Bakelite resin varnish (phenol formaldehyde type) | 42.8 |
| Mineral spirits | 17.6 |
| Cobalt drier cooked in | 2.0 |

The pigment was 50 per cent by weight of total non-volatile (vehicle and pigment).

For the damar test the pigment was formulated in a damar solution consisting of 50 per cent damar and 50 per cent turpentine, using 70% by weight of damar solution and 30% by weight of 100 per cent titanium dioxide pigment.

Although the foregoing examples have illustrated the invention with respect to the preparation of commercially pure titanium dioxide pigment, it will be understood that the methods of the invention may be applied to the preparation of composite titanium dioxide pigments which contain extenders such as barium sulfate, or calcium sulfate, or to the extender pigments themselves, or to the white pigments, for example, white lead, or zirconium oxide, and also to colored pigments, such as the lemon yellow lead titanate or chromate colors. It is also to be understood that the invention is not limited to the use of soluble meta-silicates but that other soluble silicates with other mol ratios of alkali to silicic acid than that of the metasilicate, can equally as well be used in the present invention.

I claim:

1. A process for producing a pigment having improved properties which comprises mixing an aqueous slurry of said pigment with a soluble silicate and a soluble salt of zirconium, thereby precipitating insoluble zirconium silicate in the presence of the pigment.

2. A process for producing a pigment having improved properties which comprises mixing with an aqueous slurry of said pigment about 1 to 10 per cent based on the weight of the pigment of an alkali metal silicate and thereafter adding to the slurry as a precipitant zirconium chloride, thereby precipitating insoluble zirconium silicate in the presence of the pigment.

3. An improved pigment comprising pigment particles and the reaction product of a water soluble silicate and a soluble salt of zirconium capable of precipitating insoluble zirconium silicate.

4. An improved pigment comprising pigment particles and the reaction product of an alkali metal silicate and zirconium chloride.

DURANT W. ROBERTSON.